United States Patent
Hussain et al.

(10) Patent No.: US 7,177,311 B1
(45) Date of Patent: Feb. 13, 2007

(54) SYSTEM AND METHOD FOR ROUTING TRAFFIC THROUGH A VIRTUAL ROUTER-BASED NETWORK SWITCH

(75) Inventors: Zahid Hussain, San Jose, CA (US); Samir Jain, Cupertino, CA (US); Naveed Alam, Cupertino, CA (US); Joseph Cheng, Sunnyvale, CA (US); Gregory Lockwood, Redwood City, CA (US); Tim Millet, Mountain View, CA (US)

(73) Assignee: Fortinet, Inc., Sunnyvale, CA (US)

( * ) Notice: Subject to any disclaimer, the term of this patent is extended or adjusted under 35 U.S.C. 154(b) by 981 days.

(21) Appl. No.: 10/163,079

(22) Filed: Jun. 4, 2002

(51) Int. Cl.
*H04L 12/56* (2006.01)

(52) U.S. Cl. ................. 370/392; 370/395.32

(58) Field of Classification Search ............... 370/392, 370/395.41, 395.32
See application file for complete search history.

(56) References Cited

U.S. PATENT DOCUMENTS

| | | | |
|---|---|---|---|
| 4,667,287 A | 5/1987 | Allen et al. | |
| 5,473,599 A | 12/1995 | Li et al. | |
| 5,490,252 A | 2/1996 | Macera et al. | |
| 5,581,705 A | 12/1996 | Passint et al. | |
| 5,633,866 A | 5/1997 | Callon | |
| 5,745,778 A | 4/1998 | Alfieri | |
| 5,825,772 A | 10/1998 | Dobbins et al. | |
| 5,841,973 A | 11/1998 | Kessler et al. | |
| 5,875,290 A | 2/1999 | Bartfai et al. | |
| 5,963,555 A | 10/1999 | Takase et al. | |
| 5,987,521 A | 11/1999 | Arrowood et al. | |
| 6,014,382 A | 1/2000 | Takihiro et al. | |
| 6,047,330 A | 4/2000 | Stracke | |
| 6,069,895 A | 5/2000 | Ayandeh | |
| 6,085,238 A | 7/2000 | Yuasa et al. | |
| 6,098,110 A | 8/2000 | Witkowski et al. | |
| 6,169,739 B1 | 1/2001 | Isoyama | |
| 6,169,793 B1 | 1/2001 | Gowdin et al. | |
| 6,173,333 B1 * | 1/2001 | Jolitz et al. | 709/240 |

(Continued)

FOREIGN PATENT DOCUMENTS

WO    0051290    8/2000

(Continued)

OTHER PUBLICATIONS

Chan, Mun C. et al., "An architecture for broadband virtual networks under customer control." IEEE Network Operations and Management Symposium. Apr. 1996. pp. 135-144.

(Continued)

*Primary Examiner*—Hassan Kizou
*Assistant Examiner*—Anthony Sol
(74) *Attorney, Agent, or Firm*—Hamilton & DeSanctis (57) ABSTRACT

A method for routing packets in a router includes establishing a flow data structure identifying a packet flow through a virtual router in the router. Next, a system executing the method receives a packet, said packet having at least one packet header. The method then compares a subset of the at least one packet header to a subset of the flow data structure. If the subset of the at least one packet header matches the subset of the flow data structure, then the packet can be hardware accelerated to a network interface. Otherwise, the packet can be either dropped, or forwarded to a general purpose processor for processing.

24 Claims, 5 Drawing Sheets

U.S. PATENT DOCUMENTS

| | | |
|---|---|---|
| 6,175,867 B1 | 1/2001 | Taghadoss |
| 6,192,051 B1 | 2/2001 | Lipman et al. |
| 6,220,768 B1 | 4/2001 | Barroux |
| 6,226,788 B1 | 5/2001 | Schoening et al. |
| 6,243,580 B1 | 6/2001 | Garner |
| 6,249,519 B1 | 6/2001 | Rangachar |
| 6,260,072 B1 | 7/2001 | Rodriguez |
| 6,260,073 B1 | 7/2001 | Walker et al. |
| 6,266,695 B1 | 7/2001 | Huang et al. |
| 6,278,708 B1 | 8/2001 | Von Hammerstein et al. |
| 6,286,038 B1 | 9/2001 | Reichmeyer et al. |
| 6,295,297 B1 | 9/2001 | Lee |
| 6,298,130 B1 | 10/2001 | Galvin |
| 6,330,602 B1 | 12/2001 | Law et al. |
| 6,338,092 B1 | 1/2002 | Chao et al. |
| 6,405,262 B1 | 6/2002 | Vogel et al. |
| 6,414,595 B1 | 7/2002 | Scrandis et al. |
| 6,434,619 B1 | 8/2002 | Lim et al. |
| 6,449,650 B1 | 9/2002 | Westfall et al. |
| 6,463,061 B1 | 10/2002 | Rekhter et al. |
| 6,466,976 B1 | 10/2002 | Alles et al. |
| 6,496,935 B1 * | 12/2002 | Fink et al. .................. 726/13 |
| 6,526,056 B1 | 2/2003 | Rekhter et al. |
| 6,532,088 B1 | 3/2003 | Dantu |
| 6,556,544 B1 | 4/2003 | Lee |
| 6,636,516 B1 | 10/2003 | Yamano |
| 6,639,897 B1 | 10/2003 | Shiomoto et al. |
| 6,658,013 B1 | 12/2003 | de Boer et al. |
| 6,697,359 B1 | 2/2004 | George |
| 6,697,360 B1 | 2/2004 | Gai et al. |
| 6,738,371 B1 * | 5/2004 | Ayres .................. 370/352 |
| 6,775,267 B1 | 8/2004 | Kung |
| 6,868,082 B1 | 3/2005 | Allen et al. |
| 6,883,170 B1 | 4/2005 | Garcia |
| 6,938,097 B1 | 8/2005 | Vincent |
| 6,944,168 B2 | 9/2005 | Paatela et al. |
| 6,985,438 B1 | 1/2006 | Tschudin |
| 7,042,843 B2 * | 5/2006 | Ni .................. 370/231 |
| 2001/0043571 A1 | 11/2001 | Jang et al. |
| 2001/0048661 A1 | 12/2001 | Clear et al. |
| 2001/0052013 A1 | 12/2001 | Munguia et al. |
| 2002/0062344 A1 | 5/2002 | Ylonen et al. |
| 2002/0066034 A1 | 5/2002 | Schlossberg et al. |
| 2002/0097872 A1 | 7/2002 | Barbas et al. |
| 2002/0099849 A1 | 7/2002 | Alfieri et al. |
| 2002/0152373 A1 * | 10/2002 | Sun et al. .................. 713/150 |
| 2002/0186661 A1 | 12/2002 | Santiago et al. |
| 2002/0191604 A1 * | 12/2002 | Mitchell et al. .................. 370/389 |
| 2003/0033401 A1 | 2/2003 | Poisson et al. |
| 2003/0108041 A1 | 6/2003 | Aysan |
| 2003/0115308 A1 | 6/2003 | Best |
| 2003/0117954 A1 | 6/2003 | De Neve et al. |
| 2003/0131228 A1 * | 7/2003 | Twomey .................. 713/153 |
| 2003/0169747 A1 | 9/2003 | Wang |
| 2003/0200295 A1 | 10/2003 | Roberts et al. |
| 2003/0212735 A1 * | 11/2003 | Hicok et al. .................. 709/201 |
| 2003/0223361 A1 | 12/2003 | Hussain et al. |
| 2003/0223406 A1 | 12/2003 | Balay |
| 2004/0042416 A1 | 3/2004 | Ngo et al. |
| 2004/0095934 A1 | 5/2004 | Cheng et al. |
| 2004/0141521 A1 | 7/2004 | George |

FOREIGN PATENT DOCUMENTS

| | | |
|---|---|---|
| WO | 0076152 | 12/2000 |
| WO | 0163809 | 8/2001 |
| WO | 0223855 | 3/2002 |
| WO | 0310323 | 12/2003 |

OTHER PUBLICATIONS

Chan, Mun C. et al "Customer Management and Control of Broadband VPN Services." Proc. Fifth IFIP/IEEE International Symposium of Integrated Network Management. May 1997. pp. 301-314.

Gasparro, D.M., "Next-Gen VPNs: The Design Challenge." Data Communications. Sep. 1999. pp. 83-95.

Hanaki, M. et al., "LAN/WAN management integration using ATM CNM interface." IEEE Network Operations Management Symposium, vol. 1. Apr. 1996. pp. 12-21.

Kapustka, S., "CoSine Communications Move VPNs 'Into the Cloud' with the Leading Managed IP Service Delivery Platform." http://wwwcosinecom/news/pr_5_24.html. Press Release, CoSine Communications. 1995. p. 5.

Keshav, S., "An Engineering Approach to Computer Networking: ATM networks, the internet, and the telephone network." Reading Mass: Addison-Wesley, Addison-Wesley Professional Computing Series. 1992. pp. 318-324.

Kim, E.C. et al., "The Multi-Layer VPN Management Architecture." Proc. Sixth IFIP/IEEE International Symposium on Integrated Network Management. May 1999. pp. 187-200.

Rao, J.R., Intranets and VPNs: Strategic Approach. 1988 Annual Review of Communications. 1998. pp. 669-674.

Tanenbaum, A.S., "Computer Networks." Upper Saddle River, N.J.: Prentice Hall PTR, 3rd Edition. 1996. pp. 348-364.

European Search Report for PCT/US03/37009 (Jul. 4, 2004) 2 pgs.

International Search Report for PCTUS03/17674. 6 pgs.

* cited by examiner

SYSTEM AND METHOD FOR ROUTING TRAFFIC THROUGH A VIRTUAL ROUTER-BASED NETWORK SWITCH

FIELD

The present invention relates generally to network switches, and more particularly to routing traffic through a virtual router-based network switch

RELATED FILES

This application is related to the following co-pending U.S. patent applications, all of which are filed concurrently herewith and incorporated herein by reference in their entireties:

application Ser. No. 10/163,162, entitled, "SYSTEM AND METHOD FOR HIERARCHICAL METERING IN A VIRTUAL ROUTER BASED NETWORK SWITCH;"

application Ser. No. 10/163,261, entitled, "NETWORK PACKET STEERING;"

application Ser. No. 10/163,073, entitled, "METHODS AND SYSTEMS FOR A DISTRIBUTED PROVIDER EDGE;"

application Ser. No. 10/163,071, entitled, "SYSTEM AND METHOD FOR CONTROLLING ROUTING IN A VIRTUAL ROUTER SYSTEM;"

application Ser. No. 10/163,079, entitled, "SYSTEM AND METHOD FOR ROUTING TRAFFIC THROUGH A VIRTUAL ROUTER-BASED NETWORK SWITCH;"

application Ser. No. 10/163,260, entitled, "SERVICE PROCESSING SWITCH;"

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, CoSine Communications, Inc. All Rights Reserved.

BACKGROUND

The use of networks, including LANs, WANS, and the Internet continues to grow at ever increasing rates. Each day, more and more systems are becoming interconnected. This has created a need for high performance network switches on the part of network service providers. Many of the switches comprise multiple modules, with many data flows between the modules themselves and between the interfaces to external networks. In some cases, these modules, including the processors residing on the modules can be partitioned into virtual routers, that is, software running on the processors that emulates the functioning of an individual physical router. As a result of the combination of hundreds of thousands of data flows for the virtual routers in these network switches, there is a need for efficiently processing packet flows, and for controlling the resources consumed within the network switch.

SUMMARY

The above-mentioned shortcomings, disadvantages and problems are addressed by the present invention, which will be understood by reading and studying the following specification.

One aspect of the present invention is a method for routing packets in a router. The method includes establishing a flow data structure identifying a packet flow through a virtual router in the router. Next, a system executing the method receives a packet, said packet having at least one packet header. The method then compares a subset of the at least one packet header to a subset of the flow data structure. If the subset of the at least one packet header matches the subset of the flow data structure, then the packet can be hardware accelerated to a network interface. Otherwise, the packet can be either dropped, or forwarded to a general purpose processor for processing.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Abbreviations

The following abbreviations may be used in the detailed description that follows. If an abbreviation is used that does not appear in the list, the meaning as used by one of skill in the art is intended.

| | |
|---|---|
| API | Application Programming Interface |
| DB | Data Base |
| CBR | Control Blade Redundancy |
| CEP | Connection End Point |
| CM | Configuration Manager (CLI or SNMP) |
| DML | Distributed Messaging Layer |
| IOCTL | Input Output Control |
| IPNOS | IP Network Operating System |
| IPSX | IP Service eXchange |
| LQ | Logical Queue |
| OM | Object Manager |
| OMCD | Object Manager Configuration Database |
| OMORI | Object Manager Object Routing and Interface |
| OMORIG | Object Manager Object Routing and Interface Global |
| OS | Operating System |
| RLS | Resource Location Service |
| RM | Resource Manager |
| VI | Virtual Interface |
| VPN | Virtual Private Network |
| VR | Virtual Router |

Operating Environment

Figure 1:
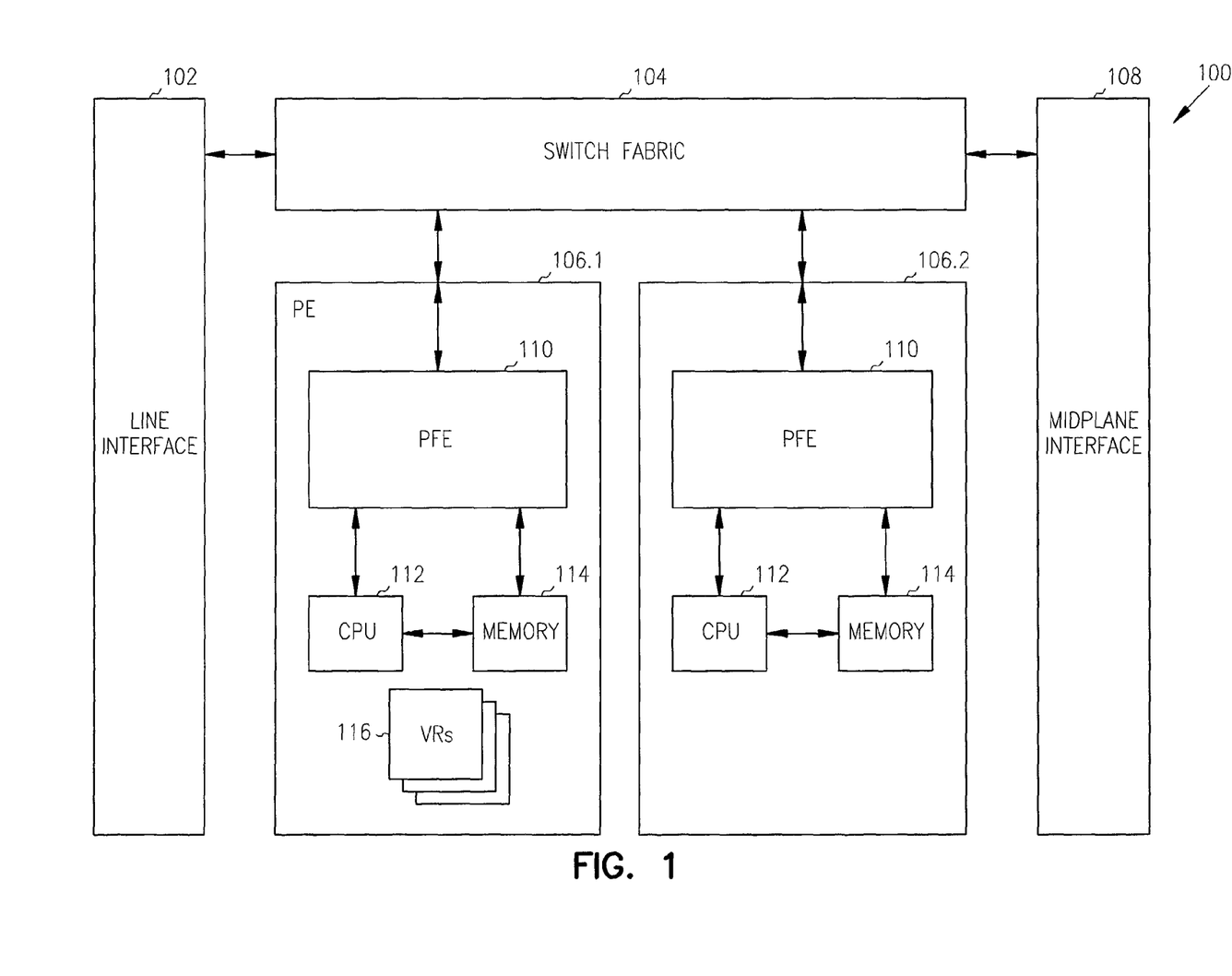
FIG. 1 is a block diagram of a virtual router hardware and operating environment in which different embodiments of the invention can be practiced.

FIG. 1 illustrates a router operating environment 100 used in some embodiments of the invention. Environment 100 includes an external network interface 102, a midplane interface 108, and at least one processing element 106 all communicably coupled through an internal network interface 104. In some embodiments, midplane interface 108 connects environment 100 to a midplane capable of interconnecting a plurality of environments 100 in a service module or a cabinet.

In one embodiment of the invention, external network interface 102 is referred to as a line interface, and provides a media access interface to wired or wireless network. Examples of such line interfaces include Gigabit Ethernet, OC-12/STM-4 POS, OC-3/STM-1 POS, and DS3C/DS3U/E3U interfaces. The invention is not limited to any particular type of line interface or network type.

In some embodiments, internal network interface 104 is a switch fabric interface. In one embodiment, the switch fabric interface is a 51.2 Gbps, 8-port, fully meshed, non-blocking switch fabric, with each port supporting a 6.4 Gbps transfer rate. However, the invention is not limited to any particular type of switch interface or internal network interface 104.

In some embodiments, processing engines 106 provide specialized application processing within environment 100. In some embodiments, processing engine 106 can be a Virtual Routing Engine (VRE) capable of providing virtual router applications 116. In alternative embodiments, processing engine 106 can be a Virtual Service Engine (VSE) capable of providing services such as firewall services and antivirus services. In further alternative embodiments, processing engine 106 can be an Advanced Security Engine capable of providing data encryption services.

Processing engine 106, in some embodiments, includes a Packet Forwarding Engine (PFE) 110, processor 112, and memory 114. Processor 112 executes computerized instructions that form the various types of applications that can be run on a processing engine 106. In one embodiment of the invention, processor 112 is a PowerPC 750CX from IBM corp. In an alternative embodiment, processor 112 is a Hi/fn 7851. In a further alternative embodiments, processor 112 is a Hi/fn 6500. The invention is not limited to a any particular type of processor. Additionally, in some embodiments of the invention, processing engine 106 includes two processors 112. The invention is not limited to any particular number of processors 112.

PFE 110, in some embodiments, comprises circuits and logic that perform hardware assisted packet routing for a processing engine 106. In general, PFE 110 analyzes packets that arrive from the internal network interface or from a DMA interface with processor 112. PFE 110 then determines whether the packet can be hardware forwarded without the intervention of processor 112, or whether such intervention is required. Further details on the structure of PFE 110 and methods implemented within PFE 110 will be provided below.

Memory 114 is a memory capable of storing data and instructions for processor 112 and PFE 110. In some embodiments, processor 112 and PFE 110 share memory 114. In alternative embodiments, each of processor 12 and PFE 110 has dedicated memory.

Figure 2:
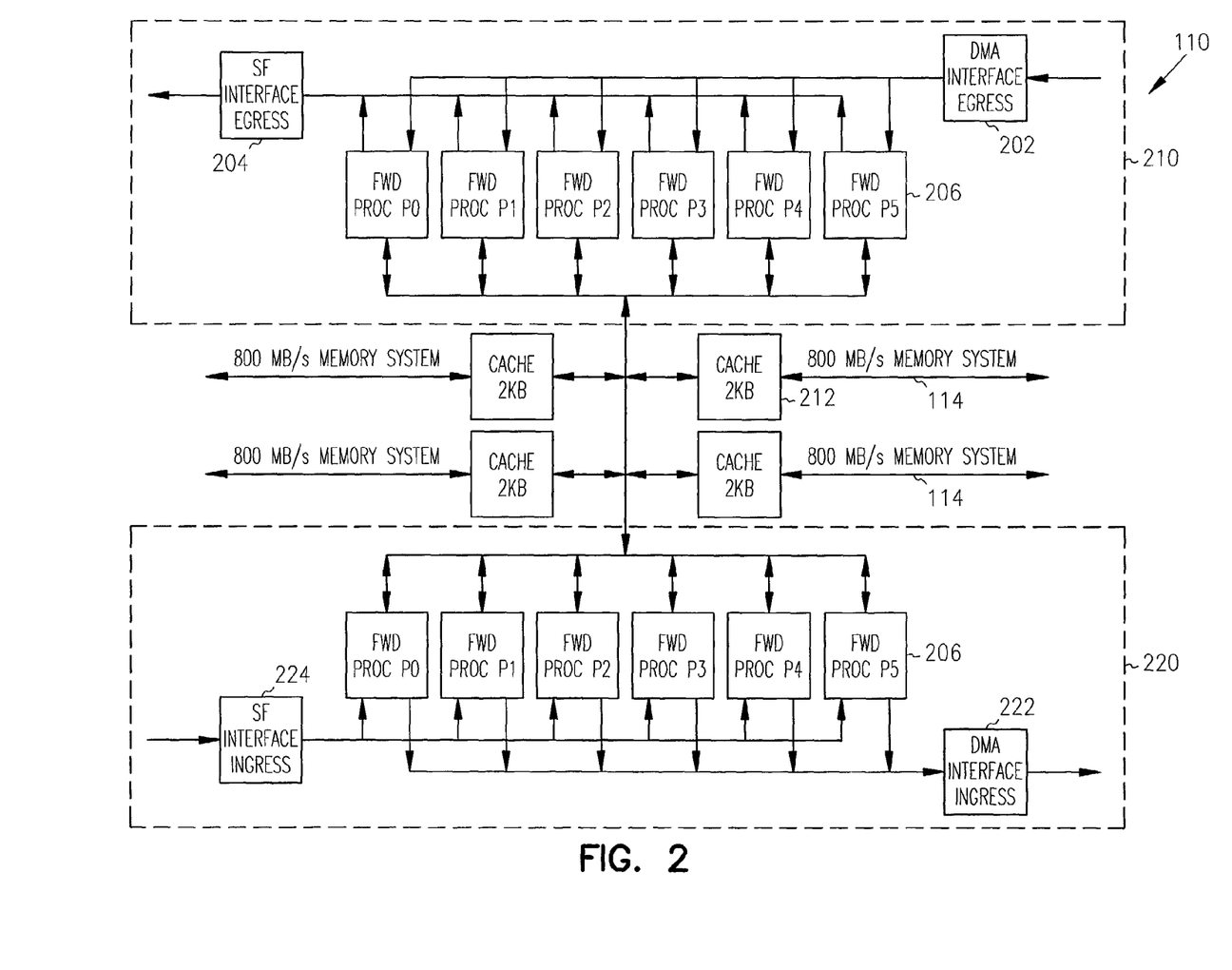
FIG. 2 is a diagram providing further details of a packet forwarding engine environment according to an embodiment of the invention.

FIG. 2 illustrates further details on a PFE 110 according to various embodiments of the invention. In some embodiments, PFE 110 is partitioned into an ingress unit 220 and egress module 210. In some embodiments, the PFE ingress unit 220 includes a switch fabric interface ingress 224 that processes incoming packets from the internal network interface 104 and transfers them to the DMA Engine ingress 222. The PFE egress unit 210 processes outgoing packets from the DMA Engine egress 202 and transfers them to the internal network 104 using a switch fabric egress module 204. In some embodiments, both the ingress and egress units have direct access to the PE memory system 114 (FIG. 1).

Further, in some embodiments, the PFE 110 operates synchronously to the processor 112 interface and memory system 114 at 100 MHz.

In some embodiments, both the PFE ingress and egress units comprises an array of 32-bit packet processors 206 that share an on-chip write-back cache 212. In some embodiments, each ingress unit 220 and egress unit 210 includes six packet processors 206. However, the invention is not limited to any particular number of packet processors. The packet processor implements a RISC-like integer instruction set with special instructions for bit field extraction and merging and for unaligned block data transfers. Each packet processor 206 operates on a different packet and hardware interlocks maintain packet order. In some embodiments, The ingress processors share common micro-code for ingress processing and the egress processors share common microcode for egress processing. In some embodiments, the PFE 110 memory maps the ingress and egress instruction stores and supports micro-code updates through PIO write transactions.

In operation, the PFE ingress unit 220 passes forwarding state to the DMA Engine 202 that incorporates this state into a packet receive descriptor. This forwarding state indicates whether the processor 112 should software forward the packet or the packet may bypass the processor and the PFE 110 can hardware forward the packet. In some embodiments, the forwarding state also includes a 20-bit index into a forwarding transform cache that describes PFE processing per packet flow. For software forwarded packets, a receive descriptor is pushed onto the DMA ingress descriptor queue. For hardware forwarded packets, the descriptor will bypass the DMA ingress queue and be pushed directly onto the DMA egress descriptor queue as a transmit descriptor.

FIGS. 3–6 are flowcharts illustrating methods for providing hardware accelerated packet routing and for controlling resources related to such hardware accelerated packet routing. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 3–6 are inclusive of the acts required to be taken by an operating environment executing an exemplary embodiment of the invention.

Figure 3:
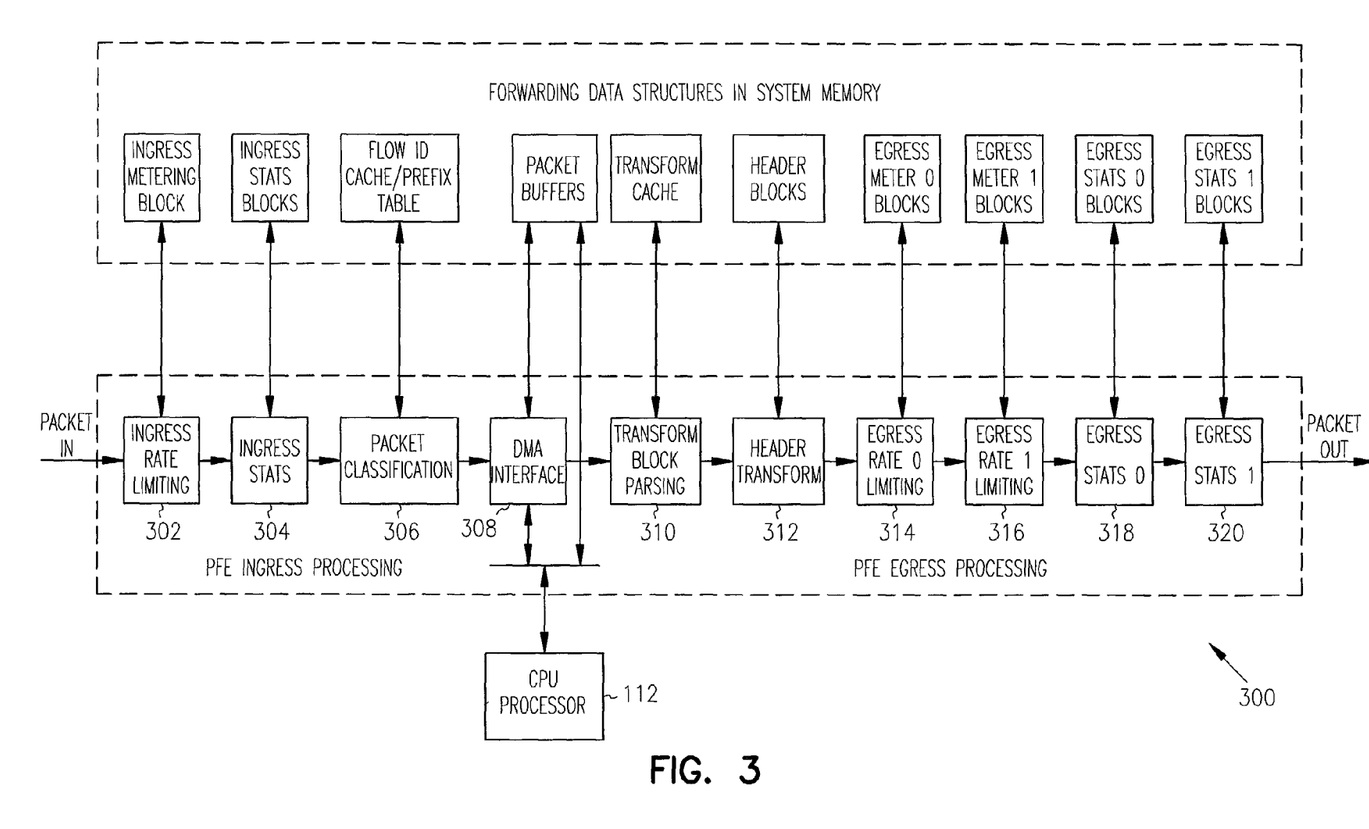
FIG. 3 is a flowchart illustrating a method for routing packets using hardware acceleration.

FIG. 3 illustrates a method for performing packet forwarding using hardware packet acceleration. The method is invoked when a packet is received by a packet processor such as packet processor 206. In some embodiments, the method begins by performing ingress rate limiting (block 302). Further details on rate limiting will be provided below. Next, ingress statistics are updated (block 304).

Next, in some embodiments of the invention, the packet is classified (block 306). Packet classification involves looking at the various protocol layer headers. As those skill in the art will appreciate, packets are typically encapsulated with various protocol headers that define sources, destinations, and applications that are to process the data in the packet. For example, layer 2 (L2) is typically a data link layer that specifies the organization of data into frames and how to send frames over a network; layer 3 (L3) is a network layer that specifies addressing assignments and how packets are forwarded, and layer 4 (L4) is a transport layer that specifies how to reliably handle data transfer. For example, TCP/IP occupies L3 and L4 in this reference model. In some embodiments, layer 1 (L1, also referred to as LQ) includes a header that specifies an LQ ID and LQ protocol to use to route packets internally within a router. The LQ ID is used to identify a particular VR that is to receive the packet.

In some embodiments, The PFE ingress unit supports two basic forms of packet classification. One is flow-based, using various fields of the LQ header along with fields in the L3/L4 headers to identify a particular VR flow (also referred to as a micro-flow). The other form uses the upper bits of the IP address or MPLS label to index a table of flow indices. The host software controls which classification form the PFE uses by programming different micro-code into the ingress instruction store. In both forms, the classification result is a 20-bit forwarding index that the hardware uses to select the correct packet transformations.

Each flow ID cache entry stores the LQ ID, LQ protocol, L3, and L4 fields that identify a particular VR flow along with state indicating whether to hardware or software forward packets belonging to the micro-flow. The PFE ingress unit generates an index into the flow ID cache by hashing the incoming packet's LQ ID, LQ protocol, L3, and L4 header fields. It then looks-up the indexed cache entry and compares the packet micro-flow ID fields to the cached micro-flow ID fields. On a cache hit, the FwdAction field of the cache entry indicates whether to software or hardware forward the packet. On a cache miss, the ingress controller allocates a cache entry and forwards the packet to software on processor 112 for flow learning.

TABLE 1

Flow ID Cache Block

| Word | Bits | Name | Description |
|---|---|---|---|
| 0 | 31 | Valid | Indicates the flow ID block is valid |
|  | 30:29 | FwdAction | Indicates forwarding action:<br>0: Pending<br>1: Software forward<br>2: Hardware forward<br>3: Hardware forward SPF |
|  | 28 | Reserved | |
|  | 27 | Age Enable | Enable for Flow Aging |
|  | 26 | Reserved | |
|  | 25:16 | VR Group ID | The VR invalidation group ID. The hardware uses this ID to select an entry in the Invalidation Tag table to determine if this FCB should be invalidated. |
|  | 15:0 | Flow Age Time | Software uses this field to set the flow lifetime in seconds. Hardware translates the flow lifetime into a expiration timestamp after which the flow will become invalid. |
| 1 | 31:16 | Pending Tag | The tag uniquely indentifies a flow from other flows which have resided in the same FCB. The tag is incremented each time the FCB is replaced by a new flow. On new flow and HW packets the SrcChan in the SF header is replaced with the tag. The tag in the FCB is compared with the tag in a FCB_UPDATE message, the tags must match for the PFE to accept the update. |
|  | 15:0 | VR Inv Tag | This field holds the VR group invalidation tag that was current at the time the FCB update message was received. |
| 2 | 31:24 | FlowCapTag | Used to determine if this flow has been counted for the current interval in flow cap processing. |
|  | 23:16 | LQ_PROTO | LQ protocol ID field. |
|  | 15:0 | LQ_ID | Destination LQID field. |
| 3 | 31:0 | L3 | L3 header fields required for flow classification. |
| 4 | 31:0 | | MPLS {Label, Exp} |
| 5 | 31:0 | | IP {Protocol, TOS, Src Addr, Dst Addr} |

TABLE 1-continued

Flow ID Cache Block

| Word | Bits | Name | Description |
|---|---|---|---|
| 6 | 31:0 | L4 | L4 header fields required for flow classification. TCP/UDP {Src Port, Dst Port} IPSec {SPI} |
| 7 | 31:0 | L2 | PPP {Protocol}, L2TP {Tunnel ID, Session ID} |

TABLE 2

Flow ID L3 formats

| Word | Bits | Name | Description |
|---|---|---|---|
| MPLS | | | |
| 3 | 31:24 | Reserved | |
|  | 23:4 | Label | MPLS Label field |
|  | 3:1 | Exp | MPLS Exp field |
|  | 0 | Stack | MPLS Stack field |
| 4 | 31:0 | Reserved | |
| 5 | 31:0 | Reserved | |
| IPv4 | | | |
| 3 | 31:16 | Reserved | |
|  | 15:8 | Proto | IP header protocol field |
|  | 7:0 | TOS | IP header TOS field |
| 4 | 31:0 | Src | IP header source address field |
| 5 | 31:0 | Dst | IP header destination address field |

TABLE 3

Flow ID L4 formats

| Word | Bits | Name | Description |
|---|---|---|---|
| TCP/UDP | | | |
| 6 | 31:16 | Src | TCP/UDP header source port field |
|  | 15:0 | Dst | TCP/UDP header destination port field |
| IPSec | | | |
| 6 | 31:0 | SPI | IPSec AH or ESP header SPI field. |

TABLE 4

L2 Tunnel/DeTunnel formats

| Word | Bits | Name | Description |
|---|---|---|---|
| PPP | | | |
| 7 | 31:8 | Reserved | |
|  | 7:0 | Protocol | PPP header protocol field |
| L2TP (LNS) | | | |
| 3 | 31:16 | Reserved | |
|  | 15:8 | Proto | Encapsulated IP header protocol field |
|  | 7:0 | TOS | Encapsulated IP header TOS field |
| 4 | 31:0 | Src | Encapsulated IP header source address field |
| 5 | 31:0 | Dst | Encapsulated IP header destination address field |
| 6 | 31:16 | Src | Encapsulated TCP/UDP source port. Reserved if IP proto != TCP or UDP |
|  | 15:0 | Dst | Encapsulated TCP/UDP dest port. Reserved if IP proto != TCP or UDP |

TABLE 4-continued

L2 Tunnel/DeTunnel formats

| Word | Bits | Name | Description |
|---|---|---|---|
| 7 | 31:16 | Tunnel ID | L2TP header Tunnel identification field. |
|  | 15:0 | Session ID | L2TP header Session identification field. |
| L2TP (LAC) | | | |
| 7 | 31:16 | Tunnel ID | L2TP header Tunnel identification field. |
|  | 15:0 | Session ID | L2TP header Session identification field. |

When the PFE controller detects a new flow, it attempts to allocate one of four FCBs selected using its hashed flow index. If the PFE finds an available FCB, it replaces the FCB tag fields, sets the FwdAction field to pending, and increments the FCB pending tag. The PFE then forwards the packet to software using a descriptor marking of FWD_NEW. At some later time, the host software sends a control packet containing an FCB_UPDATE message for this flow, which sets up the FCB.

If the PFE is unable to allocate an FCB, it forwards the packet to software using a descriptor marking of FWD_COLLISION. This indicates to software that the packet's flow collided with other currently active flows in the FCB cache.

In the time between the first packet's arrival and the arrival of the FCB_UPDATE message for that flow, the PFE forwards all packets of that flow to software marked with a FWD_NEW descriptor. In the case that another new flow replaces the FCB before an FCB_UPDATE message arrives, the PFE uses the FCB's Pending Tag field to uniquely identify the flow for FCB_UPDATE messages.

For each new flow, the PFE ingress controller replaces the FCB flow tag fields and increments the pending tag. Upon the arrival of an FCB_UPDATE message the PFE compares the pending tag in the FCB and the message, and if they are equal accepts the message. If the pending tags differ when the FCB_UPDATE message arrives, the PFE ignores the update message. In this way, the PFE ignores stale FCB update messages.

If the packet can be hardware forwarded, the packet processor then performs tranform block processing (block 310). The PFE maintains a table of Transform Control Blocks (TCBs), which direct how the egress controller processes outgoing-packets. The egress controller uses the 20-bit forwarding index, carried by the DMA descriptor, to select a transform control block from the table before processing packets. Each transform control block entry contains 64-bytes formatted as described in the table below.

TABLE 5

Transform Control Block

| Word | Bits | Name | Description |
|---|---|---|---|
| 0 | 31:28 | PktCmd | Packet forwarding command: 0: Discard packet. 1: Forward packet. 2: Return packet to CPU. 3–15: Reserved |
|  | 27:20 | Reserved | |
|  | 19:16 | PktDst | Forwarding destination for the packet: 0: Processor Engine 1: Security Engine 2: Line Interface |

TABLE 5-continued

Transform Control Block

| Word | Bits | Name | Description |
|---|---|---|---|
| | | | 3: PPPoE Interface |
| | | | 4: Tunnel Interface |
| | | | 6–15: Reserved |
| | 15:0 | PkMTU | Packet MTU. |
| 1 | 31 | NAT_IP | Perform NAT on IP addresses. |
| | 30 | DropCpuPkt | If this bit is set and the Pkt desc is HW_COH the packet is dropped |
| | 29 | NAT_TCP | Perform NAT on TCP/UDP port addresses. |
| | 28 | ReplaceRM | Replace Rate Marking field in SF header. |
| | 27 | ReplaceID | Replace IP header ID field with incremented PktID. |
| | 26 | ValidCRC | Validate IP header checksum. |
| | 25 | DecrTTL | Decrement the IP or MPLS header TTL value. |
| | 24 | ReplacePRI | Replace Priority field in SF header. |
| | 23:16 | TOS/EXP | IP TOS/MPLS EXP replacement value |
| | 15:8 | TOS/EXP Enables | Enables for IP TOS/MPLS EXP replacement. (Set high to replace bit) |
| | 7:4 | MPLS Operation | MPLS Operation Code 0: NOP 1: PUSH 2: POP_PEEK 3: POP_FWD 4: SWAP 5: POP_L2VPN_NULL 6: POP_L2VPN_CTRL |
| | 3 | PWE3 Enable | PWE3 special case handling of L2 packets. |
| | 2 | PWE3 Control | PWE3 control word should be added. Used when CW is "optional" |
| | 1:0 | Reserved | |
| 2 | 31:0 | StatsOutPtr0 | Memory pointer to egress statistics block 0. |
| 3 | 31:0 | StatsOutPtr1 | Memory pointer to egress statistics block 1 (Always assumed enabled). |
| 4 | 31:16 | HdrOffset | Indicates the number of bytes before the start of payload when an application specific header is located. Used for PPPoE. Also used for detunneling, indicates the number of bytes to strip before detunneling. |
| | 15:0 | HdrLen | Byte length of the transform header. |
| 5 | 31:0 | HdrPtr | Memory pointer to the transform header data. |
| 6 | 31:0 | NAT.IPSrc | IP source address NAT replacement value. |
| 7 | 31:0 | NAT.IPDst | IP destination address NAT replacement value. |
| 8 | 31:16 | NAT.TCP Src | TCP/UDP source port NAT replacement value. |
| | 15:0 | NAT.TCP Dst | TCP/UDP destination port NAT replacement value. |
| 9 | 31:0 | PktIdPtr | Memory pointer to packet ID value. |
| 10 | 31:0 | MeterOutPtr 0 | Memory pointer to egress metering control block 0. |
| 11 | 31:0 | MeterOutPtr 1 | Memory pointer to egress metering control block 1. |
| 12 | 31:8 | Reserved | |
| | 7:0 | EgressQos Index | Mode and memory pointer to the egress QOS translation table |
| 13 | 31:0 | L3 Header Ptr | Memory pointer to the L3 encapsulation header |
| 14 | 31:0 | L3 Header Size | Size of the L3 encapsulation header |
| 15 | 31:16 | FCBTag | The value of the corresponding FCB pending tag must be written here to associate the TCB with the flow. A value of 0 needs to be written in prefix mode. |
| | 15:0 | TCPChkAdj | TCP Checksum adjustment for TCP transforms. |

To update a Transform Control Block (TCB), host software sends a control packet containing a PFE_EGRESS_WR message with an address parameter that points to the new TCB. Software should issue the TCB update control packet before issuing the packet being forwarded. This ensures that the forwarded packet is processed according to the updated TCB.

In some embodiments, several fields may be used to maintain packet order and associate the TCB with a specific flow. In flow mode, where several NEW packets for a flow could be sent to the CPU, there is a danger that once the CPU updates the TCB and FCB a packet could be hardware forwarded while the CPU still has packets for that flow. In one embodiment, packet order is enforced by the TCB. When the TCB is written the DropCpuPkt bit should be zero, this will allow the CPU to send the NEW packets it has for that flow. However, when the first FWD_HW packet is seen with this bit clear, the packet forwarding engine (e.g., packet forwarding engine 110) will update the TCB and set this bit. Subsequent packets from the CPU (recognized because they are marked FWD_HW_COH) will be dropped. In alternative embodiments, packet order may be maintained by a conflict cache in the DMA engine.

There is also a consistency check performed between the FCB and the TCB. On ingress the SF header SrcChan is replaced with the PendingTag field of the FCB, on egress the SrcChan is compared against the FCBTag field of the TCB. If the tags mismatch the packet is dropped. For prefix mode the SrcChan is replaced with zero, and the FCBTag field must be initialized to zero.

Next, a packet processor executing the method performs header transformation (block 312). In its simplest form, the packet header transformation involves the replacement of some number of header bytes of an ingress packet with some number of bytes of replacement header data. Under the control of a Transform Control Block, the PFE egress unit can selectively replace and recompute specific fields in a small set of protocol headers.

The PFE egress unit begins the header transform by stripping the incoming packet's SF header along with the number of bytes indicated by the SF header offset field. At that point, the controller will begin copying bytes from the buffer pointed to by the TCB's HDRPTR field into the egress packet buffer. The PFE will copy the number of new header bytes defined by the TCB's HDRLEN field.

After performing this header replacement, the PFE then goes through the TCB enable bits to determine what other header transformations need to be made. The attached Appendix A provides further details regarding some of these transformations.

Next, egress rate limiting is performed (blocks 314, 316). Further details on rate limiting are presented below.

Finally, egress statistics are updated (blocks 318, 320), and the method returns to block 302 to await reception of another packet.

Figure 4:
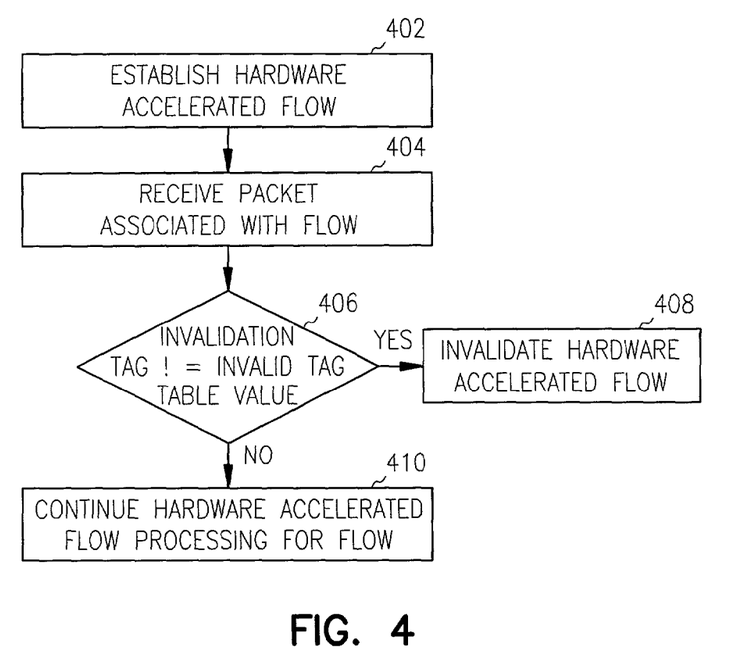
FIG. 4 is a flowchart illustrating a method for invalidating a hardware accelerated packet flow.

FIG. 4 is a flowchart illustrating a method for invalidating a hardware accelerated packet flow. The method begins by establishing a packet flow for a virtual router (block 402). The establishment of a packet flow has been described above in reference to FIG. 3.

Next, the method receives a packet associated with the flow (block 404). Upon receiving a packet, the method determines if the flow should be invalidated or not (block 406). In some embodiments of the invention, a flow cache block (FCB) describing the flow maintains VR Group ID value. This value is compared to a tag entry in a VR group invalidation table. If the values are different, the flow is invalid and is marked as such (block 408). The packet may be dropped, or it may be forwarded to software running on processor 112 for reestablishment of a flow or other processing. Otherwise, the flow is valid and hardware acceleration continues for the packet (block 410).

In some embodiments, the VR group invalidation is typically incremented (thereby causing the FCB value and the VR group invalidation table value to differ) upon the occurrence of one of several events. One event is flow expiration. In some embodiments, a PFE ingress controller applies a flow expiration timestamp to each new flow at the time software establishes the flow. Software defines the flow lifetime by setting the FCB Flow Age Time field with the number of seconds the flow should remain active. The FCB Age Enable field must be set for flow aging to be applied.

When a packet arrives for a valid flow, the PFE ingress controller compares the incoming packet's assigned timestamp with the FCB expiration timestamp. If the packet's timestamp exceeds the flow's expiration timestamp, then the PFE will invalidate the flow and send the packet to software with fwdCtl=FWD_NEW.

In addition to flow aging, the PFE microcode supports a software-initiated flow invalidation scheme. At the time software establishes a new flow with an FCB_UPDATE, it assigns the flow to one of 1024 VR invalidation groups by setting the FCB VR Group ID field. The PFE maintains an invalidation tag for each of the VR groups in a table, during the FCB_UPDATE the PFE copies the associated invalidation tag from the table and stores it into the new flow's FCB. Each time a packet arrives for that flow, the PFE ingress controller compares the FCB invalidation tag with the tag value in the associated invalidation table entry. If the PFE detects that an invalidation event has occurred for that flow then the flow is re-established as a new flow. Software can invalidate all member flows of a VR group by changing the value of the invalidation tag in memory with a MEM_WR command to the appropriate address.

In some embodiments, VR Group index 0 is reserved for pending flows, and the tag value in the invalidation table must be zero.

TABLE 6

VR Group Invalidation Tag Entry Format

| Word | Bits | Name | Description |
|------|------|------|-------------|
| 0 | 31:16 | Reserved | |
|   | 15:0 | VR Inv Tag | VR group invalidation tag. |
| 1 | 31:0 | Reserved | |

Additionally, in some embodiments, when software sets the FCB's Flow Action field to Hardware Forward SPF, the PFE performs special TCP header checks before hardware forwarding packets in this flow. If the PFE detects SYN, FIN, or RST flags set, then it pushes the packet to software for SPF state machine processing. Also, a FIN or RST flag will automatically invalidate the FCB for subsequent packets.

Figure 5:
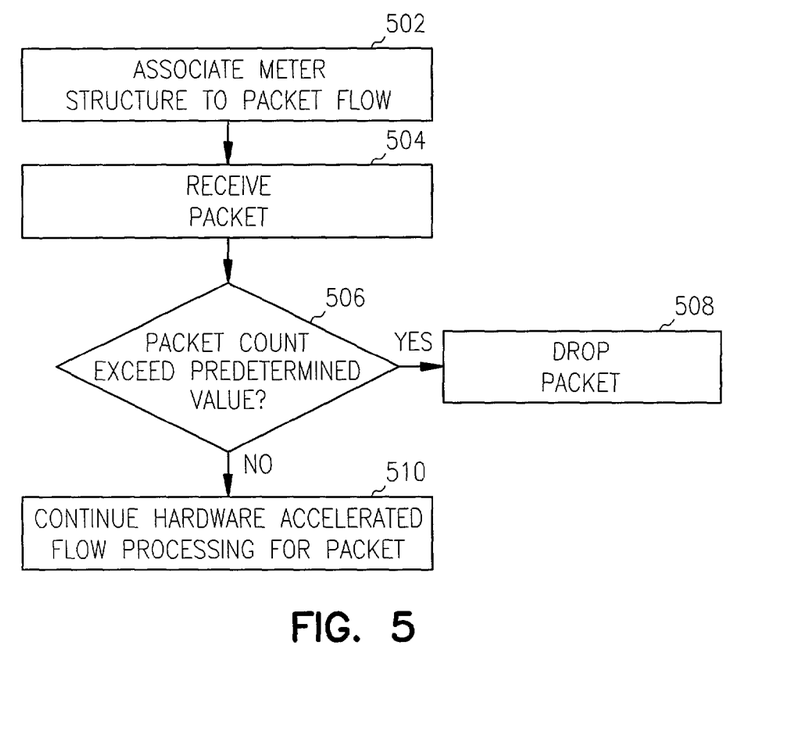
FIG. 5 is a flowchart illustrating a method for packet flow capping.

FIG. 5 is a flowchart illustrating a method for packet flow capping. The method begins by associating a meter structure to a packet flow (block 502). Details on the meter structure are presented in the attached Appendix A. The meter structure contains various statistics associated with the flow, including packet counts for a time interval. Next, a system executing the method receives a packet (block 504). In response a packet counter in the meter structure is incremented.

Next, the packet count is compared to a predetermined maximum value to determine if the flow as exceeded the allowable packet count (block 506). If the maximum count is exceeded, the packet can be dropped (block 508). Otherwise, the packet can be processed as part of the normal hardware accelerated flow (block 510).

In some embodiments, he PFE egress unit independently rate limits ingress and egress packets, if enabled. As part of rate limiting, the PFE meters, marks and drops packets. The PFE performs ingress rate limiting before header transformation and performs egress rate limiting after header transformation. Software controls metering and rate marking using a combination of Metering Control Blocks (MCBs) and fields in the TCB and ingress Statistics Blocks.

In some embodiments, the PFE implements both ingress and egress rate metering and marking according to the two-rate three color marker (trTCM) definition in RFC 2698. Per this definition, in color-blind mode the PFE marks the drop precedence color of a packet as Green if it does not exceed the CBS, Yellow if it exceeds the CBS but not the PBS, and Red if it exceeds both CBS and PBS. The packet's color is encoded into the rm field of the LQ header. The PFE increments the C and P buckets by the CIR and PIR values, respectively, in 1 ms intervals.

The PFE egress unit may optionally drop Yellow or Red packets or may color packets for a downstream dropper. The RateInCtl and RateOutCtl fields of the TCB control whether and how to drop packets on ingress and egress rate limiting.

A set of Metering Control Blocks (MCBs) maintained in system memory contain per flow (VR, VI, or ACL) trTCM parameters. Table 7 defines the MCB data structure. Hardware provides three logical metering units: VI-based ingress metering, flow-based ingress metering, and flow-based egress metering. The TCB contains two MCB pointers for flow-based metering. The VI-based MCB pointer is contained in the VI-based stats block and will be discussed in more detail in the attached Appendix A.

TABLE 7

Metering Control Block

| Word | Bits | Name | Description |
|------|------|------|-------------|
| 0 | 31:0 | Green_bytes (lower) | Bottom 32 bits of green-metered bytes count. |
| 1 | 31:0 | Ctokens | Number of bytes in C token bucket |
| 2 | 31:0 | Ptokens | Number of bytes in P token bucket |
| 3 | 31:0 | Metered_pkts (lower) | Bottom 32 bits of metered packet count. |
| 4 | 31:0 | Yellow_bytes (lower) | Bottom 32 bits of yellow-metered bytes count. |
| 5 | 31:0 | Red_bytes (lower) | Bottom 32 bits of red-metered bytes count. |
| 6 | 31:0 | Timeslot | 1 ms timeslot value. |
| 7 | 31:0 | Reserved | |
| 8 | 31:0 | CIR | Committed information rate m bytes/timeslot. |
| 9 | 31:0 | PIR | Peak information rate in bytes/timeslot. |
| 10 | 31:0 | CBS | Committed burst size in bytes. |
| 11 | 31:0 | PBS | Peak burst size in bytes. |
| 12 | 63:32 | Metered_pkts (upper) | Upper 32 bits of metered packet count. |
| 13 | 63:32 | Green_bytes (upper) | Upper 32 bits of green-metered byte count. |
| 14 | 63:32 | Yellow_bytes (upper) | Upper 32 bits of yellow-metered byte count. |
| 15 | 63:32 | Red_bytes (upper) | Upper 32 bits of red-metered byte count. |

Software controls where and how the hardware accesses MCBs by setting up arrangements of MCB pointers. The MCB pointer data structure contains a 32-Byte aligned memory pointer along with mode control bits as detailed in the table below. In it's simplest form, the pointer field indicates the memory location of a single MCB. In its most complex mode, the pointer indicates the location of an ordered array of up to 8 MCB pointers. When the hardware loads an MCB pointer array, it performs metering and rate marking starting with the first MCB pointer and continuing as directed by the Next Pointer field in the MCB pointer. Software can disable rate marking completely by setting all 4 bytes of the MCB pointer 0.

TABLE 8

MCB Pointer Format

| Bit Field | Name | Description |
|---|---|---|
| 31:5 | Memory Pointer | This field contains a memory pointer to an MCB, an MCB pointer array, or a Rate Marking Translation Table. The Metering Mode field determines which mode to use. This pointer must be 32-byte aligned. |
| 4:3 | Metering Mode | This fields determines to what structure the Memory Pointer field points: 0: MCB-Color Blind 1: MCB-Color Aware 2: MCB Array 3: Reserved |
| 2:1 | Drop Policy | This field indicates the traffic policing policy: 0: No dropping 1: Drop on red marking only 2: Drop on yellow or red marking 3: Reserved |
| 0 | Next Pointer | This field indicates whether the hardware should continue to the next MCB pointer in an array: 0: Stop after the current pointer 1: Continue to the next MCB pointer in the array. |

It should be noted that the metering can be applied to both packets, or it can be applied to bytes transferred in the flow. Metering by number of packets is desirable.

Figure 6:
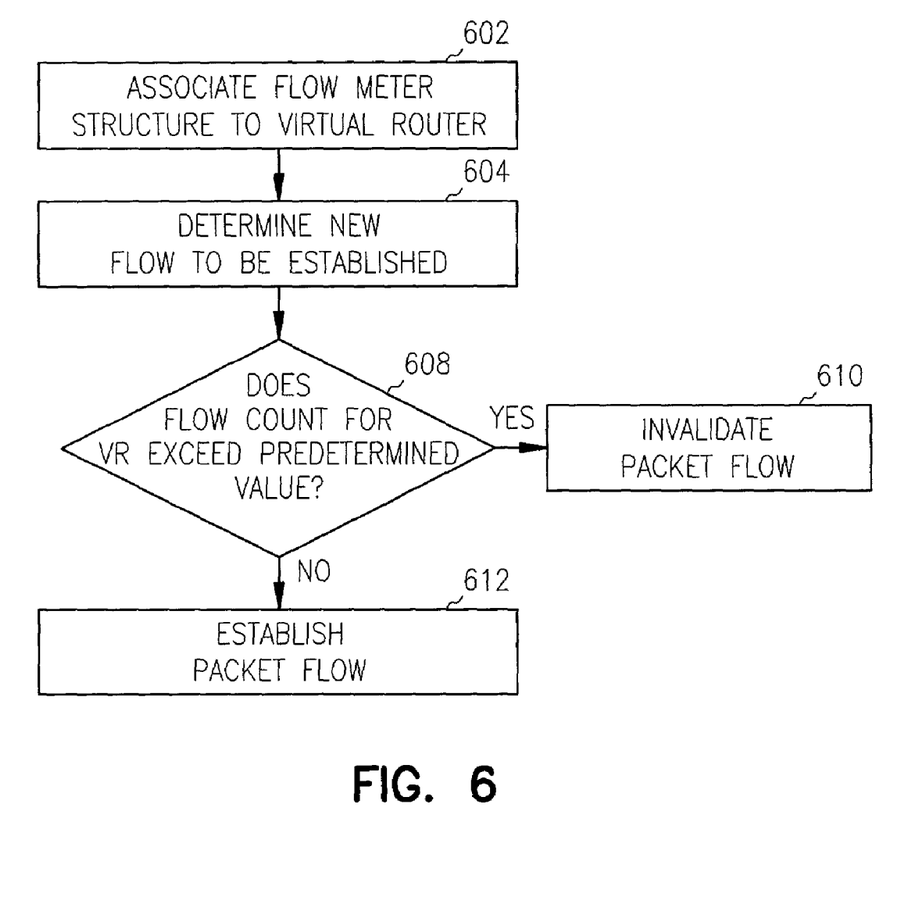
FIG. 6 is a flowchart illustrating a method for limiting resource consumption for hardware accelerated packet flows.

FIG. 6 is a flowchart illustrating a method for limiting resource consumption for hardware accelerated packet flows. The method begins by associating a flow meter structure to a virtual router (block 602). Next, the system executing the method determines that a new flow is to be established for the virtual router (block 604). The system then checks the see if the flow count (i.e. the number of flows associated with the VR) would exceed a predetermined value (block 608). If so, the new packet flow is invalidated (alternatively, it need not be created) (block 610). Otherwise, the hardware accelerated packet flow is established.

The flow cap feature is intended to allow the system to restrict the number flows in the flow cache a particular VR can consume. Packets are associated with a flow cap structure based on LQID, an index into the flow cap table is located in the ingress statistics block.

The FlowCap field of the flow cap structure is used to set the maximum number of flows allowed, and to disable flow cap processing with a value of 0. If flow cap processing is disabled no further processing is done. Otherwise the flow cap structure is checked to see if the current time interval has expired, if the structure needs to be initialized, or if there is a mismatch between the FlowCapTags in the structure and the FCB. When software sets up a flow cap structure the ExpTime field should be set to 0, this will indicate to the microcode that the structure needs to be initialized, and timer expiration processing will be performed. When the timer has expired the flow cap structure will be updated for the next interval, FlowCount will be copied to PrevMax, FlowCount will be set to 1 to count the current flow, FlowCapTag will be incremented, and ExpTime will be set to current_time+ExpInterval. When a flow is counted due to expiration or tag mismatch the FCB will be updated to copy the FlowCapTag from the flow cap structure to the FCB. If a flow with a tag mismatch is processed, but the flow cap has been reached then the FCB will be invalidated, and the packet discarded.

New flows are also counted, and if the flow cap is exceeded the flow will not be established.

To insure that timer has expiration is correctly identified the ExpInterval should be set to less than half the full range (2G). With time units of 1 mS this allows for up to 24 days for the maximum interval, far greater than is reasonable for actual use.

TABLE 9

Flow Cap Structure

| Word | Bits | Name | Description |
|---|---|---|---|
| 0 | 31:0 | FlowCount | Active flow count for the current time interval |
| 1 | 31:0 | PrexMax | Active flow count from previous time interval |
| 2 | 31:0 | ExpTime | Time stamp when this interval will be over |
| 3 | 31:24 | FlowCapTag | Tag to match against FCB to determine if flow has been counted |
| | 23:0 | Reserved | |
| 4 | 31:0 | ExpInterval | Length of the flow count interval, in milliseconds. |
| 5 | 31:0 | FlowCap | Maximum number of flows allowed, 0 disables flow cap |
| 6 | 31:0 | Reserved | |
| 7 | 31:0 | Reserved | |

In some embodiments of the invention, a multiprocessor system that uses a shared memory, a cache lock bit is used to enforce ownership of a shared data structure, such as one of the data structures described above or in the attached appendix. When a first processor, such as packet processor 206 loads a data structure, the lock bit is set in the cache tag store. A second processor requesting the data structure is denied access until the lock bit is reset. The lock bit is reset when the first processor completes an update of the data structure. When requesting access to the data structure, the first processor performs a "load-memory-lock", and when complete, the first processor performs a "store-memory-unlock". Accordingly, only one processor may update a data structure in cache at a time. Data structures include metering control blocks and status blocks. The cache lock bit is included within the cache tag store for each data element in the cache.

CONCLUSION

Systems and methods for hardware accelerated packet routing are disclosed. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

We claim:

1. A method comprising:
   establishing a packet flow cache having a plurality of entries each identifying one of a plurality of virtual router (VR) flows through a VR-based network device and corresponding forwarding state information;
   receiving a packet at a processing engine of a plurality of processing engines of the VR-based network device;
   determining one or more appropriate packet transformations for application to the packet by an ingress unit of a packet forwarding engine associated with the processing engine by performing flow-based packet classification on the packet;
   using a result of the flow-based packet classification to retrieve an entry of a plurality of entries of the packet flow cache;
   on a packet flow cache hit, determining, based on the corresponding forwarding state information of the retrieved packet flow cache entry, whether to software forward the packet via a processor of the VR-based network device or hardware forward the packet without intervention by the processor via a network interface of the VR-based network device;
   on a packet flow cache miss, identifying the existence of a new VR flow and upon successful allocation of a new entry of the packet flow cache for the new VR flow, forwarding the packet to software on the processor for flow learning.

2. The method of claim 1, further comprising:
   establishing a hardware accelerated flow within the packet flow cache, the hardware accelerated flow having associated therewith an identifier and an invalidation tag;
   if the packet is determined to be part of the hardware accelerated flow, then retrieving a value from an invalid tag table by indexing into the invalid tag table with the identifier and comparing the invalidation tag to the retrieved value; and
   invalidating the hardware accelerated flow when the retrieved value does not match the invalidation tag.

3. The method of claim 1, further comprising:
   associating a rate metering structure with a VR flow of the plurality of VR flows;
   maintaining a rate statistic within the rate metering structure indicative of a number of packets associated with the VR flow that have been observed during a predefined time interval; and
   enforcing a maximum packet rate cap for the VR flow by dropping the packet if the packet would cause the rate statistic to exceed the maximum packet rate cap for the predefined time interval.

4. The method of claim 1, further comprising:
   associating a flow metering structure with a VR of a plurality of VRs of the VR-based network device;
   for each VR flow assigned to the VR, incrementing a corresponding flow counter in the flow metering structure;
   comparing the corresponding flow counter to a predetermined limit value;
   if the corresponding flow counter does not exceed the predetermined limit value then establishing the new VR flow, otherwise refusing to establish the new VR flow.

5. The method of claim 1, wherein the processing engine comprises a Virtual Service Engine (VSE) configured to provide one or more services.

6. The method of claim 5, wherein the VSE provides antivirus services.

7. The method of claim 5, wherein the VSE provides firewall services.

8. The method of claim 1, wherein the processing engine comprises an Advanced Security Engine (ASE) capable of providing data encryption services.

9. A computer-readable medium having stored thereon instructions, which when executed by one or more processors cause the one or more processors to perform a method comprising:
   establishing a packet flow cache having a plurality of entries each identifying one of a plurality of virtual router (VR) flows through a VR-based network device and corresponding forwarding state information;
   receiving a packet at a processing engine of a plurality of processing engines of the VR-based network device;
   determining one or more appropriate packet transformations for application to the packet by an ingress unit of a packet forwarding engine associated with the processing engine by performing flow-based packet classification on the packet;
   using a result of the flow-based packet classification to retrieve an entry of a plurality of entries of the packet flow cache;
   on a packet flow cache hit, determining, based on the corresponding forwarding state information of the retrieved packet flow cache entry, whether to software forward the packet via a processor of the VR-based network device or hardware forward the packet without intervention by the processor via a network interface of the VR-based network device;
   on a packet flow cache miss, identifying the existence of a new VR flow and upon successful allocation of a new entry of the packet flow cache for the new VR flow, forwarding the packet to software on the processor for flow learning.

10. The computer-readable medium of claim 9, wherein the method further comprises:
    establishing a hardware accelerated flow within the packet flow cache, the hardware accelerated flow having associated therewith an identifier and an invalidation tag;
    if the packet is determined to be part of the hardware accelerated flow, then retrieving a value from an invalid tag table by indexing into the invalid tag table with the identifier and comparing the invalidation tag to the retrieved value; and
    invalidating the hardware accelerated flow when the retrieved value does not match the invalidation tag.

11. The computer-readable medium of claim 9, wherein the method further comprises:
    associating a rate metering structure with a VR flow of the plurality of VR flows;
    maintaining a rate statistic within the rate metering structure indicative of a number of packets associated with the VR flow that have been observed during a predefined time interval; and
    enforcing a maximum packet rate cap for the VR flow by dropping the packet if the packet would cause the rate statistic to exceed the maximum packet rate cap for the predefined time interval.

12. The computer-readable medium of claim 9, wherein the method further comprises:
    associating a flow metering structure with a VR of a plurality of VRs of the VR-based network device;
    for each VR flow assigned to the VR, incrementing a corresponding flow counter in the flow metering structure;

comparing the corresponding flow counter to a predetermined limit value;
if the corresponding flow counter does not exceed the predetermined limit value then establishing the new VR flow, otherwise refusing to establish the new VR flow.

13. The computer-readable medium of claim 9, wherein the processing engine comprises a Virtual Service Engine (VSE) configured to provide one or more services.

14. The computer-readable medium of claim 13, wherein the VSE provides antivirus services.

15. The computer-readable medium of claim 13, wherein the VSE provides firewall services.

16. The computer-readable medium of claim 9, wherein the processing engine comprises an Advanced Security Engine (ASE) capable of providing data encryption services.

17. A virtual router (VR)-based network device comprising:
a means for establishing a packet flow cache having a plurality of entries each identifying one of a plurality of VR flows through the VR-based network device and corresponding forwarding state information;
a means for receiving a packet at a processing engine of a plurality of processing engines of the VR-based network device;
a means for determining one or more appropriate packet transformations for application to the packet by an ingress unit of a packet forwarding engine associated with the processing engine by performing flow-based packet classification on the packet;
a packet flow cache retrieval means for using a result of the flow-based packet classification to retrieve an entry of a plurality of entries of the packet flow cache;
a means, responsive to the packet flow cache retrieval means, for determining on a packet flow cache hit and based on the corresponding forwarding state information of the retrieved packet flow cache entry whether to software forward the packet via a processor of the VR-based network device or hardware forward the packet without intervention by the processor via a network interface of the VR-based network device;
a means, responsive to the packet flow cache retrieval means, for identifying on a packet flow cache miss the existence of a new VR flow and upon successful allocation of a new entry of the packet flow cache for the new VR flow, for forwarding the packet to software on the processor for flow learning.

18. The VR-based network device of claim 17, further comprising:
a means for establishing a hardware accelerated flow within the packet flow cache, the hardware accelerated flow having associated therewith an identifier and an invalidation tag;
a means for retrieving a value from an invalid tag table by indexing into the invalid tag table with the identifier and comparing the invalidation tag to the retrieved value if the packet is determined to be part of the hardware accelerated flow; and
a means for invalidating the hardware accelerated flow when the retrieved value does not match the invalidation tag.

19. The VR-based network device of claim 17, further comprising:
a means for associating a rate metering structure with a VR flow of the plurality of VR flows;
a means for maintaining a rate statistic within the rate metering structure indicative of a number of packets associated with the VR flow that have been observed during a predefined time interval; and
a means for enforcing a maximum packet rate cap for the VR flow by dropping the packet if the packet would cause the rate statistic to exceed the maximum packet rate cap for the predefined time interval.

20. The VR-based network device of claim 17, further comprising:
a means for associating a flow metering structure with a VR of a plurality of VRs of the VR-based network device;
a means, responsive to VR flow assignment to the VR, for incrementing a corresponding flow counter in the flow metering structure;
a comparing means for comparing the corresponding flow counter to a predetermined limit value;
a means, responsive to the comparing means, for establishing the new VR flow if the corresponding flow counter does not exceed the predetermined limit value, otherwise refusing to establish the new VR flow.

21. The VR-based network device of claim 17, wherein the processing engine comprises a Virtual Service Engine (VSE) configured to provide one or more services.

22. The VR-based network device of claim 21, wherein the VSE provides antivirus services.

23. The VR-based network device of claim 21, wherein the VSE provides firewall services.

24. The VR-based network device of claim 17, wherein the processing engine comprises an Advanced Security Engine (ASE) capable of providing data encryption services.

* * * * *